United States Patent
Heiska et al.

(10) Patent No.: US 6,785,547 B1
(45) Date of Patent: Aug. 31, 2004

(54) METHOD AND APPARATUS FOR IMPLEMENTING NETWORK PLANNING

(75) Inventors: Kari Heiska, Helsinki (FI); Olli Pekonen, Espoo (FI); Hannu Kauppinen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 740 days.

(21) Appl. No.: 09/604,793

(22) Filed: Jun. 28, 2000

(30) Foreign Application Priority Data

Oct. 29, 1998 (FI) .................................................. 982352

(51) Int. Cl.$^7$ ............................................. H04B 17/02
(52) U.S. Cl. ...................................... 455/446; 370/255
(58) Field of Search ............................... 455/446, 447; 370/241, 254, 255

(56) References Cited

U.S. PATENT DOCUMENTS

| | | | | |
|---|---|---|---|---|
| 5,491,644 A | * | 2/1996 | Pickering et al. | 709/226 |
| 5,689,812 A | * | 11/1997 | Takahashi | 455/67.16 |
| 5,710,758 A | * | 1/1998 | Soliman et al. | 370/241 |

FOREIGN PATENT DOCUMENTS

| | | |
|---|---|---|
| WO | WO 97/44977 | 11/1997 |
| WO | WO 97/45750 | 12/1997 |
| WO | WO 98/38756 | 9/1998 |
| WO | WO 98/47244 | 10/1998 |

* cited by examiner

*Primary Examiner*—Nick Corsaro
(74) *Attorney, Agent, or Firm*—Pillsbury Winthrop LLP

(57) ABSTRACT

A method and apparatus implement network planning in a radio system in a desired area. To determine transmitter coverage, a vector map describing the surroundings of the transmitter and containing a description of buildings and surfaces reflecting radio waves in the area is used. The transmitter signal strength is measured at points of a desired area. A subset is selected among the points, path attenuation is determined between all subset points using a ray tracing method, and the calculated values are stored in a memory. When performing network planning, a transmitter and a receiver are located at the points in the areas; a given number of the most significant signal paths among the possible signal propagation paths between the transmitter and the receiver is searched for using the values stored in the memory, and the transmitter signal strength is determined at the receipt location point using the ray tracing method.

10 Claims, 2 Drawing Sheets

METHOD AND APPARATUS FOR IMPLEMENTING NETWORK PLANNING

FIELD OF THE INVENTION

The invention relates to a method and an apparatus for implementing network planning in a radio system in a desired area, where at least a two-dimensional vector map comprising a description of the buildings and surfaces reflecting radio waves in the area is used for determining the coverage area of a transmitter of the system.

BACKGROUND OF THE INVENTION

When a radio system is being constructed, a desired coverage area is to be achieved with the lowest possible cost. When considering the locations of the base stations in the system the required traffic capacity and the achieved coverage area are taken into account. The aim is to locate the base stations so that an extensive coverage area is achieved and that the base station is advantageously located as far as the radio wave propagation is concerned.

Different methods and instruments have been created for radio network planning. Digital maps providing modeled information on the terrain and buildings in the desired area are generally used as instruments in radio network planning. By using a vector map a computer can be employed to calculate coverage areas and parameters associated with network operation for different base station locations.

Prior art solutions require a lot of calculation capacity and time, because each transceiver link is calculated in real time. Particularly when densely populated areas are modeled using ray tracing the calculation time is extensive, since the densely populated areas comprise a lot of surfaces and corners reflecting radio waves, from where the radio waves scatter. Thus, several possible signal paths are created that have to be taken into account in the calculation.

It is thus important to determine signal fading in different areas when determining the coverage area of the transmitter. When simulating the behaviour of the system signal fading has to be modeled as realistically as possible. Particularly in an urban environment fading is a quantity changing in time depending on the geometry of the buildings surrounding the base station and the terminal, the walls and other scattering surfaces.

Conventionally fading has been divided into two different types, fast and slow fading, but this is a very rough division. In reality, multipath fading of a signal is caused by phase differences, and when a terminal moves the change in phase differences causes reciprocating variation to the signal strength which can typically be seen at the correlation distances from half a wave length to hundreds of wave lengths depending on the environment.

In prior art solutions, in moving radio system simulators, such as the link-level simulators implemented for example by COSSAP, fadings are simulated by adding attenuation and fading to the transmitted signal. Fast fading is typically generated by simulating a stationary random process according to Rayleigh or Rice distributions. Fading is thereafter averaged using an appropriate filter.

However, prior art methods comprise several problems and deficiencies. In typical simulators, for instance in the link-level simulators implemented by COSSAP, the reception algorithms are realistic, but the problem is how realistic the channel model is. A realistic channel model can be achieved using a ray tracing, or beam, search channel model. However, this is obstructed by the computational complexity required by a ray tracing method that prevents the implementation of the method in practice.

BRIEF DESCRIPTION OF THE INVENTION

It is an object of the invention to provide a method and an apparatus implementing the method so as to solve the above problems. This is achieved with the method of the invention for implementing network planning in a radio system in a desired area, where at least a two-dimensional vector map comprising a description of the buildings and surfaces reflecting radio waves in the area is used for determining the coverage area of a transmitter of the system, and where the signal strength of the transmitter is determined at different points in the desired area. The method of the invention comprise the steps of selecting a subset among the points within the area, determining path attenuation between all subset points using a ray tracing method, storing the calculated values in a memory, and, when performing network planning in the desired area, locating the transmitter and a receiver at the desired points in the area, and by means of the values stored in the memory searching for a given number of the most significant signal paths among the possible signal propagation paths between the transmitter and the receiver, and determining the signal strength of the transmitter on the signal paths determined at a location point of the receiver using the ray tracing method.

The invention further relates to an apparatus for implementing network planning in a radio system in a desired area comprising means for maintaining at least a two-dimensional vector map describing the desired area and comprising a description of the buildings and surfaces reflecting radio waves in the area, and means for determining the signal strength of a transmitter at different points in the desired area. The apparatus of the invention comprises means for maintaining information about a subset of the points in the area, the means for determining path attenuation between all subset points using a ray tracing method, the means for storing the calculated values, and, when performing network planning, the means for determining a given number of the most significant signal paths among the possible signal propagation paths between the transmitter and the receiver located at the desired points in the area using the values stored in a memory and the means for determining the signal strength of the transmitter on the signal paths determined at the receiver location point using the ray tracing method.

The preferred embodiments of the invention are disclosed in the dependent claims.

Several advantages are achieved with the method and apparatus of the invention. In the solution of the invention a set of points is selected from the area described on the map, and path attenuation between said points is calculated beforehand and the paths and attenuation values are stored in the memory. When actually planning the path said pre-calculated values can be utilized and the amount of calculation is thus reduced and the path planning is accelerated.

BRIEF DESCRIPTION OF THE DRAWINGS

In the following the invention will be described by means of the preferred embodiments with reference to the accompanying drawings, in which.

DETAILED DESCRIPTION OF THE INVENTION

Figure 1:
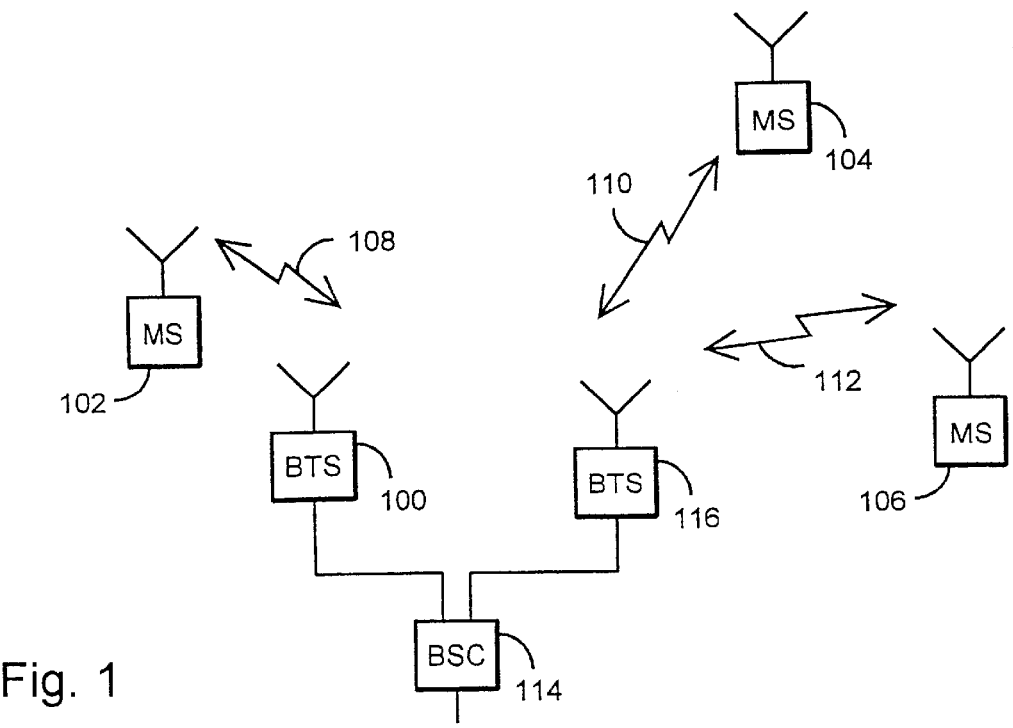
FIG. 1 illustrates a radio system where a method of the invention can be applied when planning the system.

A method of the invention can preferably be applied in radio system planning. FIG. 1 describes by way of example the essential parts of a typical radio system structure. The system comprises a set of base stations 100, 116 and a set of generally moving subscriber terminals 102–106 having a bi-directional connection 108–112 with one of the base stations 100, 116. The base stations 100, 116 transfer the connections of the terminals 102–106 to a base station controller 114, which forwards them to other parts of the network and to a fixed network. The base station controller 114 controls the operation of one or more base stations 100, 116. The digital GSM cellular radio system can be mentioned as an example of the systems according to the invention. However, the invention is not restricted thereto, as is obvious for those skilled in the art. The invention is applicable to be used in other cellular radio systems too.

In network planning the base stations 100, 116 are to be located as advantageously as possible so that the coverage area of each base station can be maximized, but in such a manner that the traffic capacity needed is reached. Network planning is necessary when the system is about to be introduced and also when an existing system is extended, for example, by adding new base stations to the system in order to increase capacity.

Figure 2A:
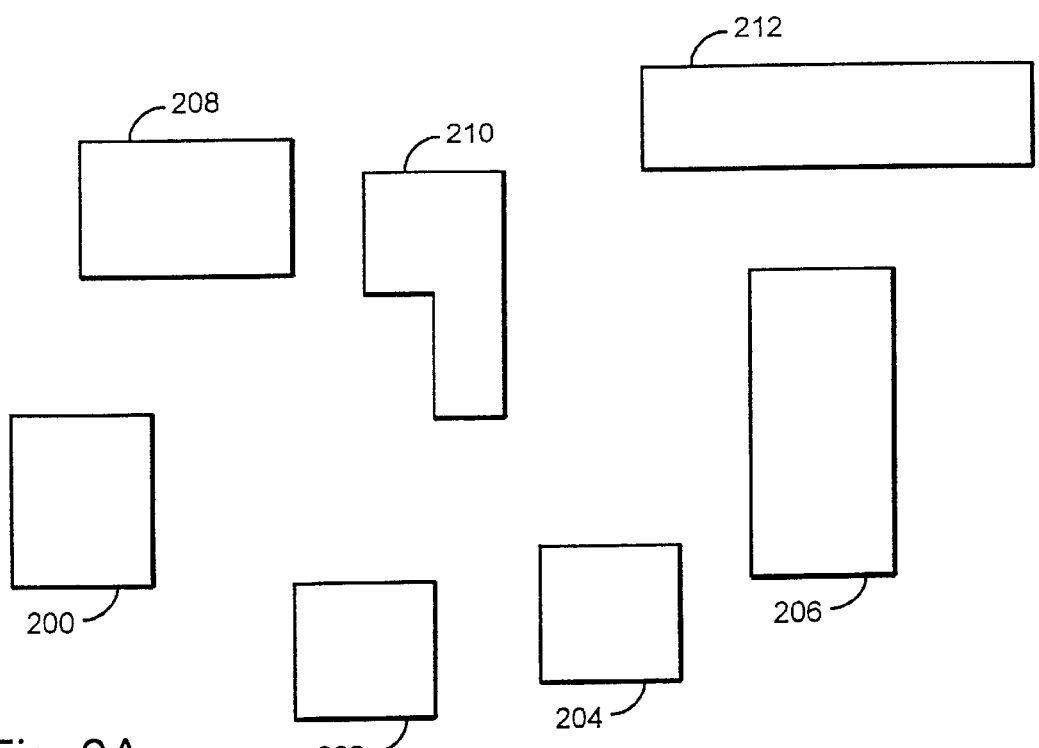
FIGS. 2a and 2b illustrate a digital map.

Vector maps providing modeled information on the terrain and building in the desired area, are generally used as instruments in network planning. By using the vector map a computer can be employed to calculate coverage areas and propagation parameters for different base station locations, and on the basis of the calculations the most preferable base station locations are selected. FIG. 2 illustrates by way of example a part of an urban area vector map. The vector map describes the buildings within the area to be examined as accurately as desired, either building-specifically or block-specifically in the larger full-scale maps. The map shown in FIG. 2a comprises seven buildings 200–212. An actual map may naturally also comprise additional terrain features than merely buildings.

Network planning is an iterative process, in which a base station is located at different locations and the base station coverage area is determined for each location spot. The solution of the invention allows the calculation of the coverage area to be highly accelerated by calculating a part beforehand and by storing the results obtained in the memory.

Figure 2B:
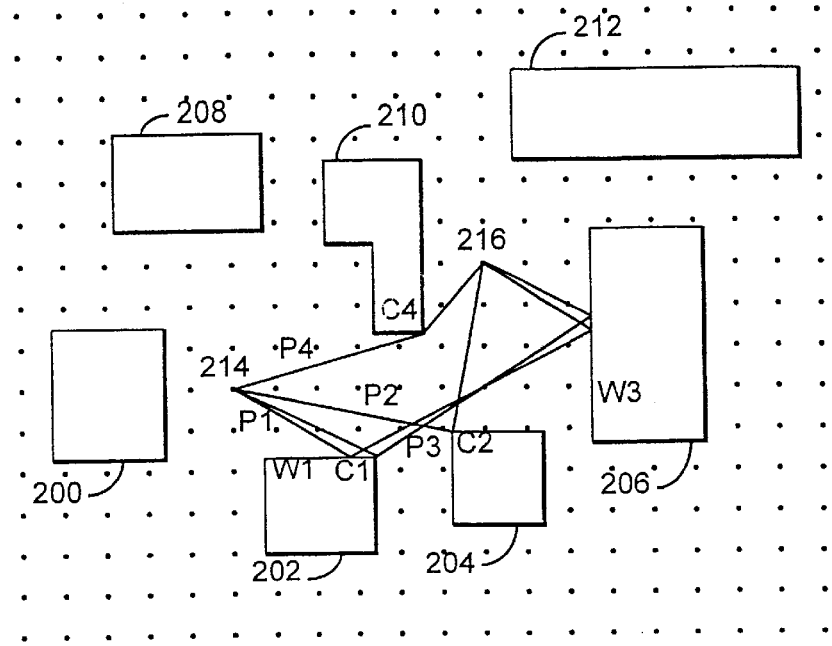
Figure 3:
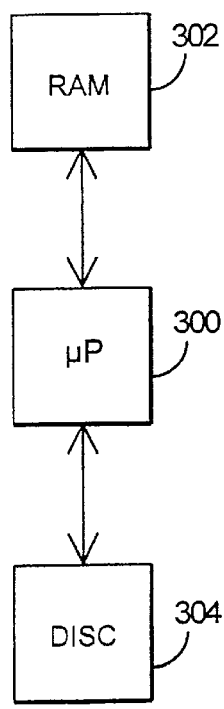
FIG. 3 illustrates an apparatus of the invention.

In the solution of the invention a subset is selected among the points in the area, the subset forming a pitched grid in a preferred embodiment of the invention in accordance with FIG. 2b. However, the points are not selected from the areas inside the buildings. Path attenuation is determined between all subset points using a ray tracing method. This is carried out in such a manner that a virtual transmitter is placed at each subset point, and the path attenuation of the transmitter signal is calculated at the other subset points taking the different propagation paths into account. When calculating path attenuation, the possible signal paths between the points, i.e. propagation paths, along which a signal can propagate from one point to another are examined. The most significant paths among the paths between each pair of points are stored in the memory together with path attenuation. FIG. 2b shows by way of example the most significant paths between two subset points 214 and 216 to be stored in the memory. Path P1 moves through wall surfaces W1 and W2. Path P2 moves through corner C2. Path P3 moves through corner C1 and wall surface W2 and path P4 moves through corner C4.

The calculated values, or the path attenuation values between the subset points and the most significant signal paths between the points are stored in the memory. The corners of the buildings and wall surfaces through which the path moves, or the information about the co-ordinates of scattering corners on a vector map are stored in the memory from the signal paths.

The solution of the invention for implementing network planning can preferably be carried out, for example, with a modern work station comprising an efficient processor (300), a working memory (302) and a disk memory (304) for a long-term storage of information and appropriate software.

The apparatus comprises memory means (304) for maintaining at least a two-dimensional vector map describing the desired area and comprising a description of the buildings and surfaces reflecting radio waves in the area. Using the processor (300) and required software the apparatus can be employed to determine the signal strength of the transmitter at different points in the desired area. In the solution of the invention the apparatus comprises in particular the memory means (302, 304) for maintaining information about a subset of the points in the area, and the processor (300) and software allow to determine the path attenuation between all subset points using a ray tracing method for storing the calculated values in the disk memory or in a memory element that enables a corresponding long-term storage. The memory element can naturally be implemented in various ways, for example as hardware, using a RW-CD drive or using another corresponding prior art apparatus.

When performing network planning using the processor (300) and software a given number of the most significant signal paths among the possible signal propagation paths of the transmitter or the receiver located at the desired points in the area is determined using the values stored in the memory and the signal strength of the transmitter is determined on the signal paths determined at the receiver location point using a ray tracing method.

When conducting actual network planning, a base station is placed in a desired location on the map and the audibility of the base station to the terminal is estimated at the different points of the map. The values stored in the memory are thus utilized in the method of the invention. The base station and the location point of the terminal that is to be checked are not necessarily located at the pre-calculated points. However, the values calculated in the memory can be used as an asset when calculating as follows.

Let us take a closer look at the solution of the invention by means of an example. Let us assume that the base station is placed at a particular point $P_1$ and the terminal at point $P_2$. The calculation points, between which the path attenuation is to be determined, are $P_1$ and $P_2$. Let us assume that the pre-calculated points closest to calculation point $P_1$ are $P_{tx1}$, $P_{tx2}$ and $P_{tx3}$. Let us also assume that the pre-calculated points closest to calculation point $P_2$ are $P_{rx1}$, $P_{rx2}$ and $P_{rx3}$. Nine possible different path combinations can be obtained between these points ($P_{tx1} \rightarrow P_{rx1}$, $P_{tx1} \rightarrow P_{rx2}$, $P_{tx1} \rightarrow P_{rx3}$, $P_{tx2} \rightarrow P_{rx1}$, etc.) All nine path possibilities are checked and the signal strength is determined on each path. Since each path is pre-calculated the most significant signal paths that have to be taken into account between each pair of points are known. It is thus previously known which signal paths can be left unnoticed and which have to be taken into account. This significantly speeds up the network planning calculation.

Even though the invention has above been explained with reference to the example in the accompanying drawings, it is obvious that the invention is not restricted thereto but can be modified in various ways within the scope of the inventive idea disclosed in the attached claims.

What is claimed is:

1. A method for implementing network planning in a radio system in a desired area, where at least a two-dimensional vector map including a description of the building and surfaces reflecting radio waves in the area is used for determining the coverage area of the transmitter of the system, and where the signal strength of the transmitter is determined at different points in the desired area, the method comprising:

selecting a subset among the points within the area, determining path attenuation between all subset points using a ray tracing method, storing the calculated values in a memory, when performing network planning in the desired area, locating the transmitter and a receiver at the desired points in the area and searching for a given number of the most significant signal paths among the possible signal propagation paths between the transmitter and the receiver, and determining the signal strength of the transmitter on the signal paths determined at a location point of the receiver using the ray tracing method.

2. A method as claimed in claim 1, further comprising determining path attenuation between all subset points by taking into account the given number of different signal propagation paths, and wherein storing the values calculated between the different points in the memory includes storing a signal path associated with each value in the memory.

3. A method as claimed in claim 2, wherein the signal path is stored in the memory by storing information about co-ordinates of reflecting surfaces and scattering corners of the signal path on a vector map.

4. An apparatus for implementing network planning in a radio system in a desired area comprising:

means for maintaining at least a two-dimensional vector map describing the desired area and including a description of the buildings and surfaces reflecting radio waves in the area, means for determining the signal strength of a transmitter at different points in the desired area, means for maintaining information about a subset of the points in the area, wherein the means for determining the signal strength also determines path attenuation between all subset points using a ray tracing method, the means for maintaining information includes means for storing the calculated values, and when performing network planning, the means for determining the signal strength determines a given number of the most significant signal paths among the possible signal propagation paths of the transmitter and the receiver located at the desired points in the area using the values stored in a memory and also determines the signal strength of the transmitter on the signal paths determined at the receiver location point using the ray tracing method.

5. An apparatus as claimed in claim 4, further comprising means for storing a number of signal paths provided by the connections between all subset points, wherein the means for storing the number of signal paths are arranged to store both the signal path and the path attenuation of the signal path.

6. The apparatus of claim 4, further comprising means for storing a number of signal paths provided by the connections between all subset points, wherein the means for storing the number of signal path are arranged to store both the signal path and the path attenuation of the signal path.

7. A method for implementing network planning in a radio system in a desired area, where at least a two-dimensional vector map including a description of the building and surfaces reflecting radio waves in the area is used for determining the coverage area of a transmitter of the system, and where the signal strength of the transmitter is determined at different points in the desired area, the method comprising:

selecting a subset of points among the points within the desired area, the subset of points forming, at least partially, a grid in the desired area, determining path attenuation between all subset points using a ray tracing method, storing the calculated values in a memory, when performing network planning in the desired area, locating the transmitter and a receiver at points included in the subset of points in the desired area and searching for a given number of the most significant signal paths among the possible signal propagation paths between the transmitter and the receiver, and determining the signal strength of the transmitter on the signal paths determined at a location point of the receiver using the ray tracing method.

8. The method of claim 7, further comprising determining path attenuation between all subset points by taking into account the given number of different signal propagation paths, and wherein storing the values calculated between the different points in the memory includes storing a signal path associated with each value in the memory.

9. The method of claim 8, wherein the signal path is stored in the memory by storing information about co-ordinates of reflecting surfaces and scattering corners of the signal path on a vector map.

10. An apparatus for implementing network planning in a radio system in a desired area comprising:

means for maintaining at least a two-dimensional vector map describing the desired area and including a description of the buildings and surfaces reflecting radio waves in the area, means for determining the signal strength of a transmitter at different points in the desired area, means for maintaining information about a subset of the points in the desired area, the subset of points forming, at least partially, a grid in the desired area, wherein the means for determining the signal strength also determines path attenuation between all subset points using a ray tracing method, the means for maintaining information includes means for storing the calculated values, and, when performing network planning, the means for determining the signal strength determines a given number of the most significant signal paths among the possible signal propagation paths of the transmitter and the receiver located at the desired points included in the subset of points in the desired area using the values stored in a memory and also determines the signal strength of the transmitter on the signal paths determined at the receiver location point using the ray tracing method.

* * * * *

UNITED STATES PATENT AND TRADEMARK OFFICE
CERTIFICATE OF CORRECTION

PATENT NO. : 6,785,547 B1
DATED : August 31, 2004
INVENTOR(S) : Kari Heiska et al.

It is certified that error appears in the above-identified patent and that said Letters Patent is hereby corrected as shown below:

<u>Title page,</u>
Item [30], Foreign Application Priority Data, add the following:
-- Oct. 29, 1999   (FI) ………………….....PCT/FI99/00905 --.

Signed and Sealed this

Twenty-fourth Day of May, 2005

JON W. DUDAS
*Director of the United States Patent and Trademark Office*